United States Patent [19]
Zielinksi et al.

[11] Patent Number: 5,983,964
[45] Date of Patent: Nov. 16, 1999

[54] METHOD AND APPARATUS FOR COUPLING WITH A SPOUT

[75] Inventors: James S. Zielinksi, Schaumburg; William J. Olson, Barrington, both of Ill.; Christopher C. Rutter, Oakland; Lamar Spalding, Hayward, both of Calif.

[73] Assignee: Packaging Systems, L.L.C., Romeoville, Ill.

[21] Appl. No.: 09/014,068

[22] Filed: Jan. 27, 1998

Related U.S. Application Data

[63] Continuation-in-part of application No. 08/567,287, Dec. 5, 1995, abandoned, and application No. 08/766,118, Dec. 16, 1996, abandoned.

[51] Int. Cl.$^6$ ...................................................... F16L 21/00
[52] U.S. Cl. .......................... 141/346; 141/385; 141/386; 137/614.04; 251/149.6
[58] Field of Search .................................... 141/346, 348, 141/349, 351–354, 383, 385, 386; 137/614.03, 614.04; 251/149.6; 285/319, 314, 322, 323

[56] References Cited

U.S. PATENT DOCUMENTS

| Re. 33,969 | 6/1992 | Richter . |
|---|---|---|
| 2,425,500 | 8/1947 | Wiggins ............................ 137/614.04 |
| 2,597,250 | 7/1952 | Kollsman . |
| 2,706,646 | 4/1955 | Olson . |
| 2,816,690 | 12/1957 | Lari . |
| 3,142,416 | 7/1964 | Federighi . |
| 3,234,965 | 2/1966 | Anderson . |
| 3,334,860 | 8/1967 | Bolton, Jr. . |
| 3,464,436 | 9/1969 | Bruning . |
| 3,513,887 | 5/1970 | Limandri ................................ 141/346 |
| 3,871,404 | 3/1975 | Courant . |
| 3,972,387 | 8/1976 | Braun . |
| 4,014,461 | 3/1977 | Harvill . |
| 4,137,930 | 2/1979 | Scholle . |
| 4,146,070 | 3/1979 | Angarola et al. . |
| 4,186,783 | 2/1980 | Brandt . |
| 4,286,636 | 9/1981 | Credle . |
| 4,353,488 | 10/1982 | Schneiter et al. . |
| 4,375,864 | 3/1983 | Savage . |
| 4,380,310 | 4/1983 | Schneiter et al. . |
| 4,421,146 | 12/1983 | Bond et al. . |
| 4,445,539 | 5/1984 | Credle . |
| 4,445,551 | 5/1984 | Bond et al. . |
| 4,485,845 | 12/1984 | Brady . |
| 4,549,577 | 10/1985 | Kugler . |
| 4,557,508 | 12/1985 | Walker . |
| 4,564,132 | 1/1986 | Lloyd-Davies . |
| 4,700,744 | 10/1987 | Rutter et al. . |

(List continued on next page.)

FOREIGN PATENT DOCUMENTS

| 2054081 | 1/1981 | United Kingdom ................... 285/322 |

*Primary Examiner*—J. Casimer Jacyna
*Attorney, Agent, or Firm*—Majestic, Parsons, Siebert & Hsue

[57] ABSTRACT

A method and apparatus for coupling with a spout to permit coupling of a valve sub-assembly housed in the apparatus with a slider valve housed in the spout. The apparatus includes a sleeve having at least two resilient finger members diverging from each other wherein each finger member has a flange engaging surface engageable with the flange portion of the spout. At least a portion of the sleeve is axially disposable about at least the flange portion of the spout, and the valve sub-assembly is slidable in the sleeve to couple with the slider valve in the spout when the sleeve is coupled to the spout. A collar is slidable over an outer surface of the sleeve for constricting the resilient finger members about the spout as the collar slides from an upper end of the sleeve and over the resilient finger members toward a lower end of the sleeve, and for releasing the constricted resilient finger members of the sleeve as the collar slides from the resilient finger members and toward the upper end of the sleeve. The flange engaging surface of the resilient finger members is engageable with the flange portion of the spout to couple the sleeve with the spout when the resilient finger members are constricted about the spout by the collar.

14 Claims, 6 Drawing Sheets

U.S. PATENT DOCUMENTS

| | | |
|---|---|---|
| 4,890,642 | 1/1990 | Smazik et al. . |
| 4,948,014 | 8/1990 | Rutter et al. . |
| 5,072,756 | 12/1991 | Carr . |
| 5,095,962 | 3/1992 | Lloyd-Davies et al. . |
| 5,215,122 | 6/1993 | Rogers et al. . |
| 5,255,713 | 10/1993 | Scholle et al. ............... 137/614.04 |
| 5,445,186 | 8/1995 | Richter et al. . |
| 5,467,806 | 11/1995 | Stricklin et al. . |
| 5,477,883 | 12/1995 | Totten . |
| 5,526,853 | 6/1996 | McPhee et al. . |

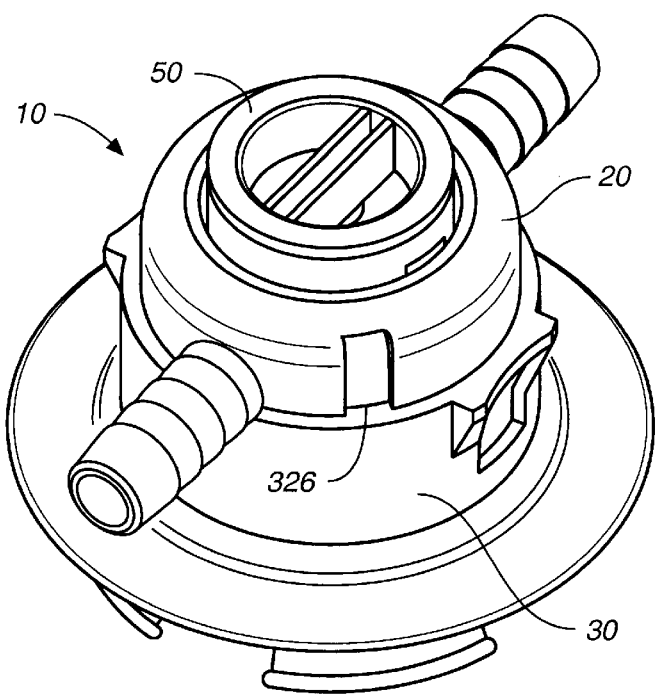
FIG._1
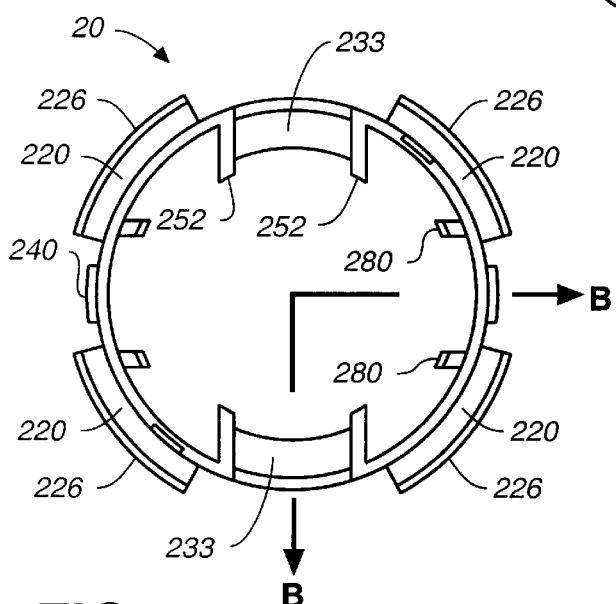
FIG._5a
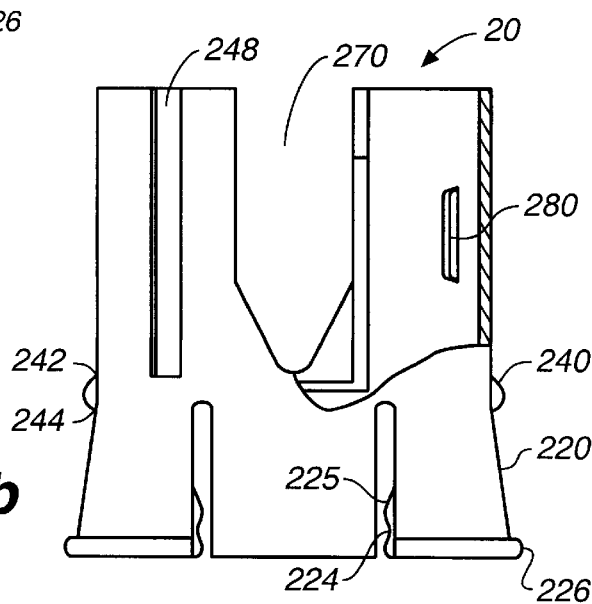
FIG._5b

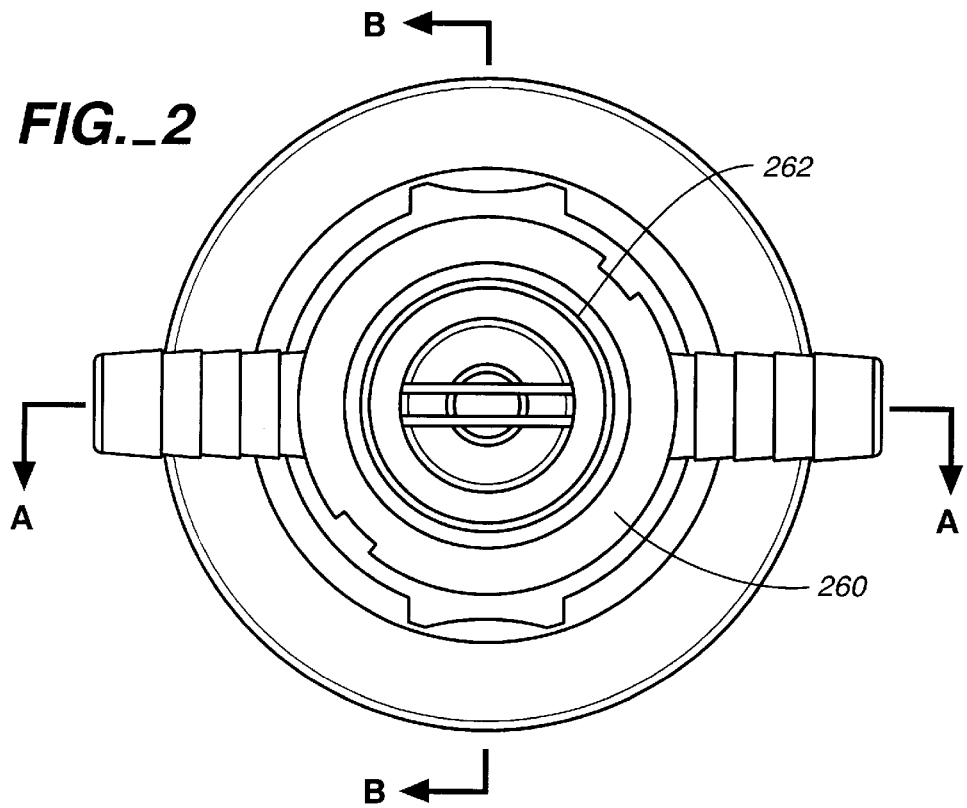
FIG._2
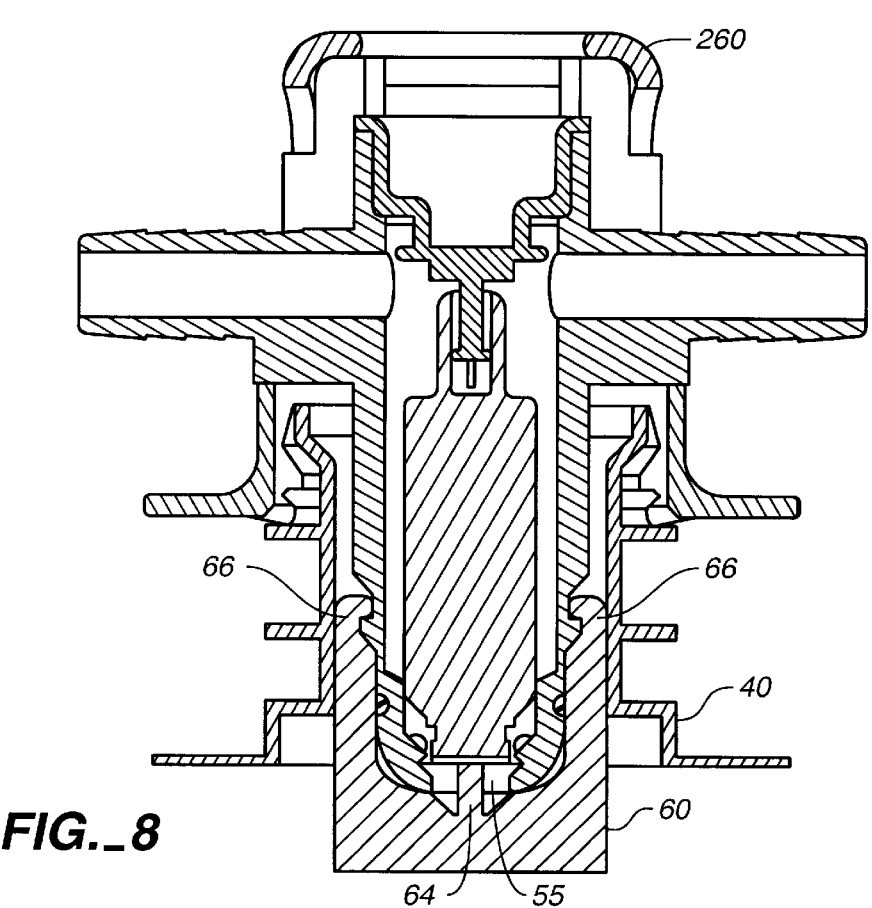
FIG._8

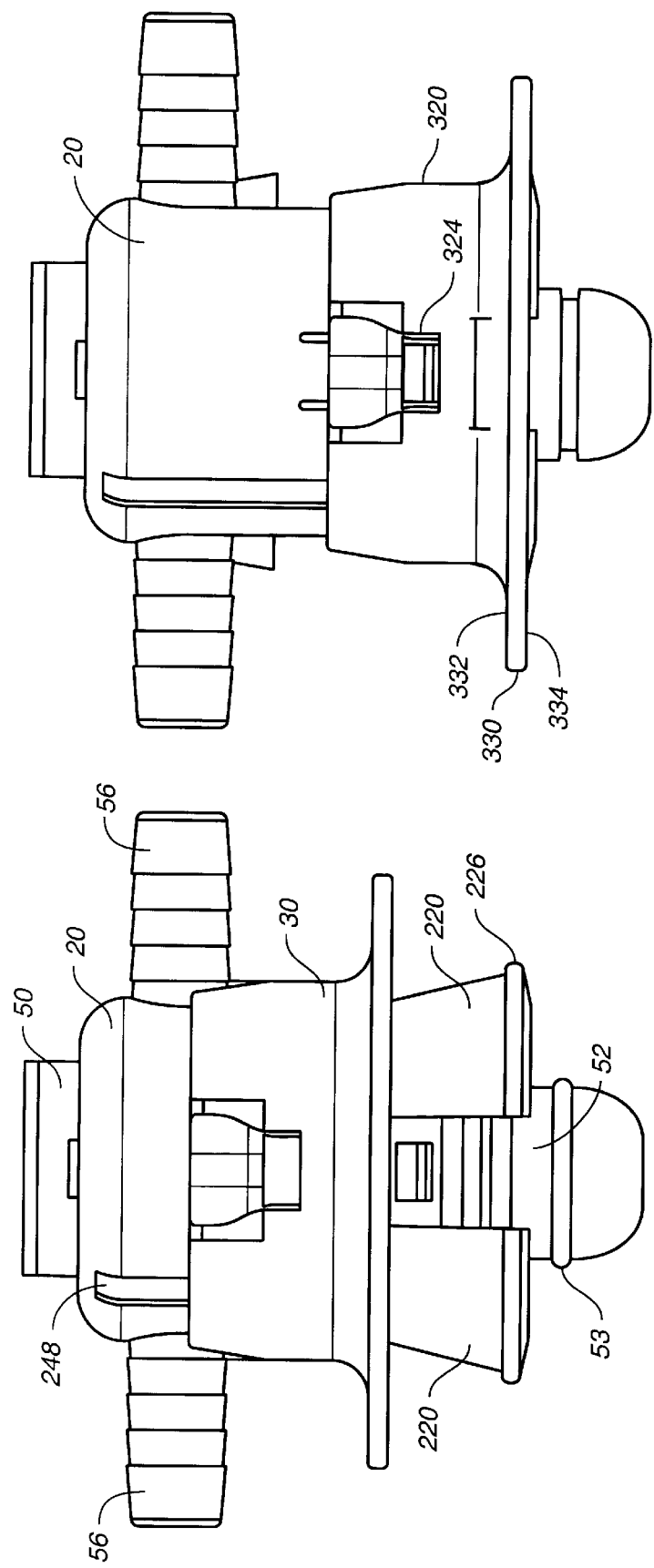

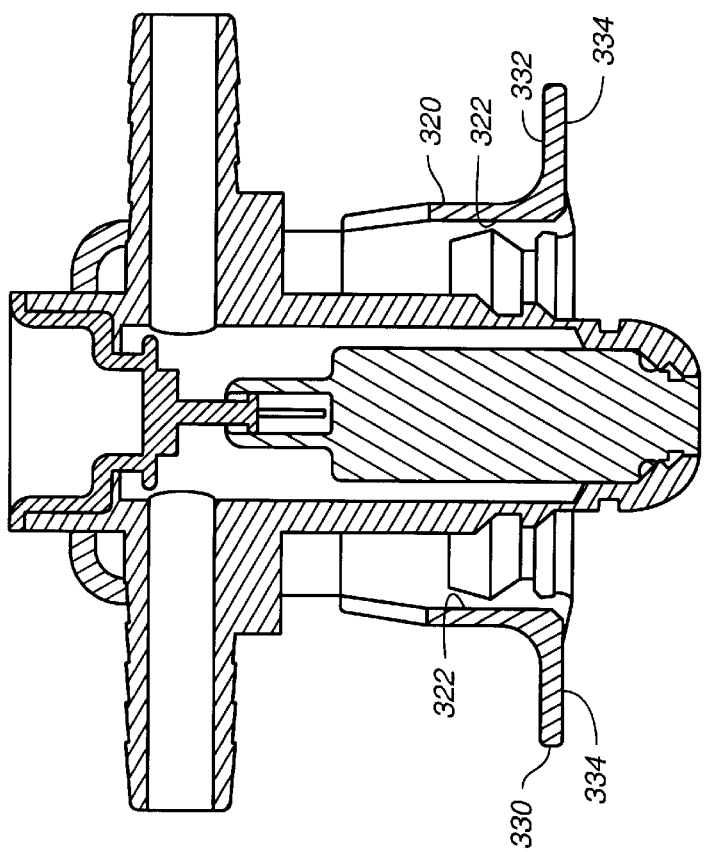
FIG._6b
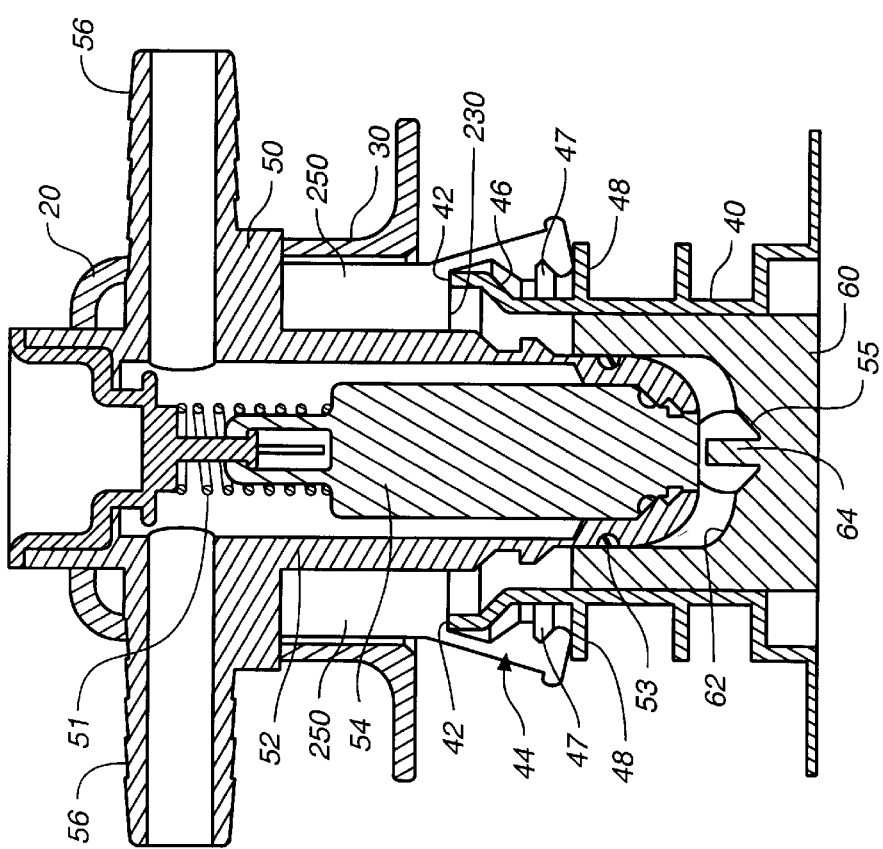
FIG._3b

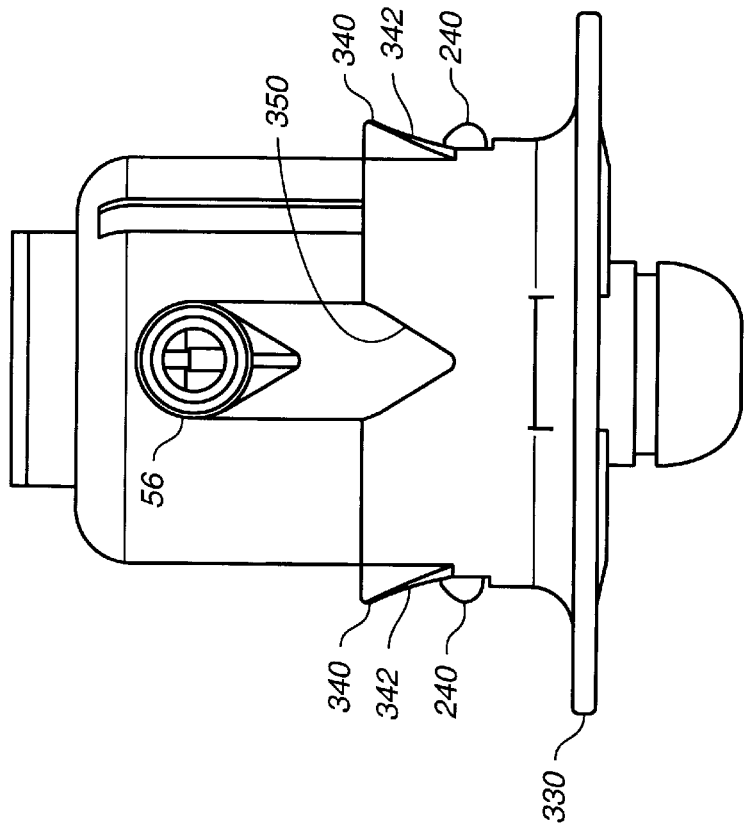
FIG._7a
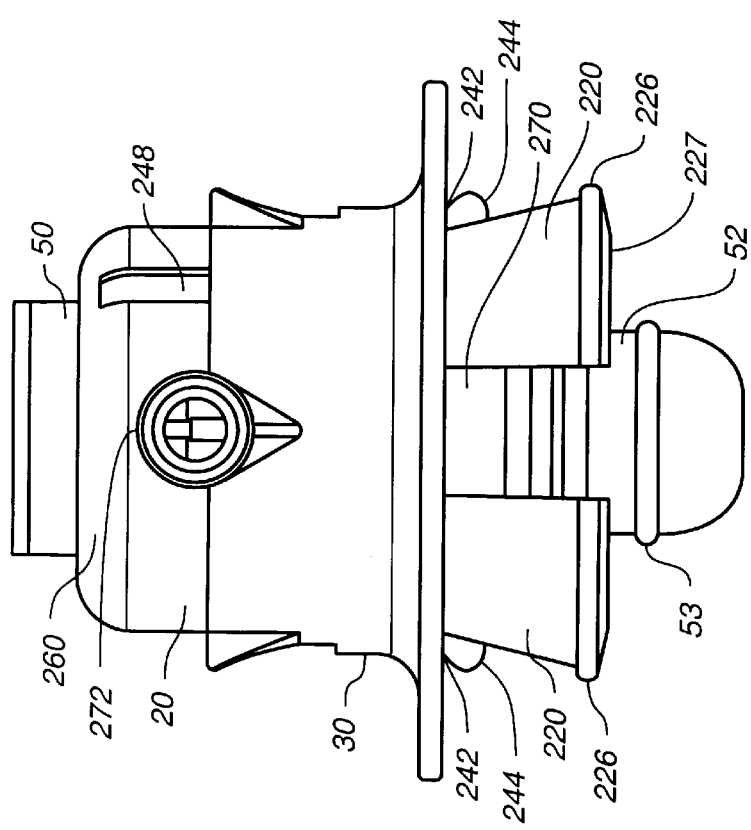
FIG._4a

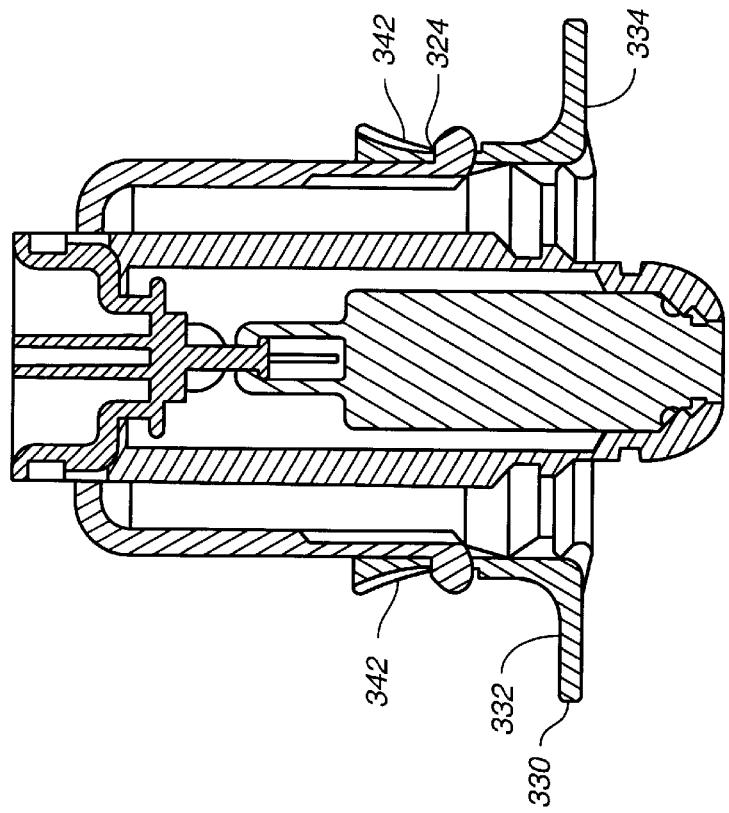
FIG._7b
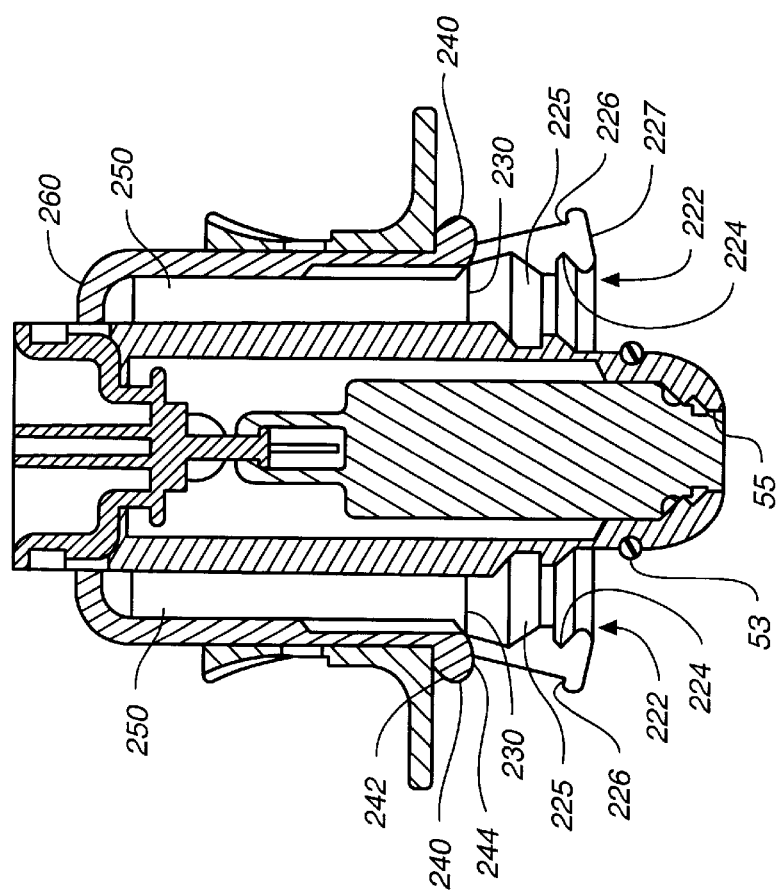
FIG._4b

METHOD AND APPARATUS FOR COUPLING WITH A SPOUT

This application is a continuation-in-part of U.S. patent applications Nos. 08/567,287, filed Dec. 5, 1995, now abandoned, and 08/766,118, filed Dec. 16, 1996, now abandoned, both of which are incorporated herein by this reference.

BACKGROUND OF THE INVENTION

The invention generally relates to a method and apparatus for quick connect and disconnect with a spout, and more specifically to an apparatus and method for axially coupling a sleeve and collar assembly to a spout for coupling a valve sub-assembly slidably housed in the sleeve to a slider valve housed in the spout.

Spouts provide access to fluid supplies in numerous applications that require coupling a connector to the spout for controlling and directing the supply of the fluid. The beverage industry for example packages beverages and beverage syrups in a collapsible bag housed in a box commonly referred to as a disposable bag-in-box package as discussed in U.S. Pat. No. 4,445,551 to Bond et al. The bag includes a spout with a slidable valve that provides access to the fluid, wherein the spout is usually accessible from outside the box and is often a gravity fluid feed system. In the past, the beverage and more generally the fluid has been accessed from the spout with a connector and valve assembly of the type discussed in U.S. Pat. No. 4,421,146 also to Bond et al. These connectors have a lower U-shaped flange portion for coupling with the spout and an upper body portion for slidably housing the valve assembly, which is slidable toward the lower U-shaped flange portion and into the spout. The connector is coupled to the spout by positioning the connector adjacent the spout and then laterally shifting or positioning the connector so that the U-shaped flange is saddled about an outer surface of the spout. Annular ribs on the outer surface of the spout retain the U-shaped flange on the spout in the axial direction as the valve assembly is slidable positioned in the body of the connector toward the lower U-shaped portion for coupling with and opening the slider valve in the spout. The connector and valve assembly however is very difficult to couple with the spout because it is first necessary to accurately position the connector adjacent the spout and align the U-shaped flange between the annular ribs, otherwise the connector cannot be laterally saddled over and coupled with the spout. Further, the valve assembly has a tendency to drop down from the upper body portion of the connector toward the lower U-shaped flange, before the connector is laterally positioned over the spout, where it obstructs and prevents the U-shaped flange from being laterally positioned over the spout. The problem is generally overcome by withdrawing the valve assembly from the connector with one hand and laterally positioning the connector over the spout with the other hand. A similar problem occurs during removal of the connector from the spout, which also requires two hands to disconnect the connector from the spout. Moreover, the valve assemblies of the lateral type connector and valve assembly tends to become separated from the connector during withdrawal of the valve assembly from the spout. The two handed operation is a source of inconvenience for users, and unnecessarily increases the time required to connect and disconnect the connector. In the case of beverage supplies in the service sectors of the economy, where timely response to customer's desire is paramount, these difficulties are further aggravated by the fact that bag-in-boxes are often stored in areas that are not readily or easily accessible as under or above a service counter and in dimly lighted environments. Other industries and applications likewise require a convenient means for connecting and disconnecting a connector with a spout, which may have a valve therein.

In view of the discussion above, there exists a demonstrated need for an advancement in the spout coupling art. It is therefore an object of the present invention to provide a novel method and apparatus for coupling with a spout that overcomes the problems in the prior art.

It is also an object of the invention to provide a novel method and apparatus that is quick and easy to connect and disconnect with a spout in a single-handed operation.

It is another object of the invention to provide a novel method and apparatus for coupling with a spout that is economical.

It is still another object of the invention to provide a novel method and apparatus for coupling with a spout that includes a sleeve and collar assembly that is axially coupled with the spout.

It is a further object of the invention to provide a novel method and apparatus for coupling with a spout that includes a sleeve with plurality of resilient finger members diverging from one another to provide an enlarged circumferential opening axially disposable over a spout, and a collar that is slidable over the sleeve to constrict the resilient finger members about a flange of the spout to couple the sleeve and collar assembly to the spout.

It is a yet another object of the invention to provide a novel method and apparatus for coupling with a spout the includes a sleeve for slidably housing a valve sub-assembly that is matable with a valve housed in the spout wherein the valve sub-assembly does not interfere with the coupling and de-coupling the sleeve and the spout, and does not become separated from the collar and sleeve assembly when the valve sub-assembly is withdrawn from the spout.

Accordingly, the present invention is directed toward a method and apparatus for coupling with a spout to permit coupling of a valve sub-assembly housed in the apparatus with a slider valve housed in the spout. The apparatus includes a sleeve having at least two resilient finger members diverging from each other wherein each finger member has a flange engaging surface engageable with the flange portion of the spout. At least a portion of the sleeve is axially disposable about at least the flange portion of the spout, and the sleeve includes a seating flange on an inner surface of the sleeve, which is seatable on an end portion of the spout. A collar is slidable over an outer surface of the sleeve for constricting the resilient finger members about the spout as the collar slides from an upper end of the sleeve and over the resilient finger members toward a lower end of the sleeve, and for releasing the constricted resilient finger members of the sleeve as the collar slides away from the resilient finger members and toward the upper end of the sleeve. The flange engaging surface of the resilient finger members is engageable with the flange portion of the spout to couple the sleeve to the spout when the resilient finger members are constricted about the spout by the collar, and the flange engaging surface of the resilient finger members is disengagable with the flange portion of the spout to de-couple the sleeve member from the spout when the constricted resilient finger members are released by the collar. The sleeve and collar also include locking means for locking the collar over the sleeve when the resilient finger members are constricted by the collar, and an end portion of the sleeve includes a outwardly extending lip portion wherein the collar seatable on the outwardly extending lip portion of the sleeve when the resilient finger members are constricted by the collar. The valve sub-assembly is slidable in the sleeve to connect and disconnect with the slider valve in the spout when the sleeve is coupled to the spout.

These and other objects, features and advantages of the present invention will become more fully apparent upon consideration of the following Detailed Description of the Invention with the accompanying drawings, having proportions which may be exaggerated for ease of understanding, wherein like structure and steps are referenced by corresponding numerals and indicators.

BRIEF DESCRIPTION OF THE DRAWINGS

FIG. 1 is a perspective view of an apparatus for coupling a valve sub-assembly to a spout with a flange portion according to an exemplary embodiment of the invention.

FIG. 2 is a top view of an apparatus according to the embodiment of FIG. 1.

FIG. 3a is a side view of the embodiment of

FIG. 1 illustrating a collar positioned above resilient finger members of a sleeve.

FIG. 3b is a sectional view of FIG. 3a along the lines A—A of FIG. 2 wherein the apparatus is axially aligned with a spout having a slider valve shown in part.

FIG. 4a is another side view of the apparatus of FIG. 1.

FIG. 4b is a sectional view of FIG. 4a along the lines B—B of FIG. 2.

FIG. 5a is a top view of an alternative embodiment of a sleeve for slidably housing the valve sub-assembly.

FIG. 5b is a partially broken side view of the alternative sleeve embodiment along lines B—B of FIG. 5a.

FIG. 6a is a side view of the embodiment of FIG. 1 illustrating the collar positioned over and constricting the resilient finger members.

FIG. 6b is a sectional view of FIG. 6a.

FIG. 7a is a another side view of the embodiment of FIG. 1 illustrating the collar positioned over and constricting the resilient finger members.

FIG. 7b is a sectional view of FIG. 7a.

FIG. 8 is a sectional view of the apparatus axially aligned with the spout illustrating the collar positioned over and constricting the resilient finger members to couple the apparatus with the spout wherein the valve sub-assembly is coupled with the silver valve of the spout.

DESCRIPTION OF THE INVENTION

FIGS. 1–4 illustrate an apparatus 10 according to an exemplary embodiment of the invention generally comprising a cooperating sleeve 20 and collar 30 assembly that is axially coupled to a spout 40 for coupling a valve sub-assembly 50 slidably disposed in the sleeve 20 with a slider valve 60 slidably disposed in the spout. FIG. 3b is a sectional view that shows the spout 40 having an end portion 42 and a flange portion 44, which includes a lip portion 46 and a first flange portion 47, extending at least partially about an outer surface of the spout. Some spouts include a second annular flange 48 that is usable as a non-essential auxiliary reference to axially align the apparatus 10 with the spout. The valve sub-assembly 50 includes a valve body 52 with outer O-ring 53 that forms a seal with the slider valve 60, and houses and actuatable stem 54 biased by a spring 51 to seat an inner O-ring for closing a fluid inlet port 55 in the body. The valve sub-assembly has additional ports 56 that communicate with the port 55, which in one embodiment forms a T-shaped valve. The slider valve 60 includes means for coupling with the valve sub-assembly, which are not completely illustrated in the drawing but are known in the art, and actuation means 64 for actuating the valve sub-assembly stem 54. The slider valve 60 is slidably positioned in the spout 40 by the valve sub-assembly 50 to permit the passage of fluid through the slider valve and into the inlet port 55 of the valve sub-assembly when the sleeve and collar assembly are coupled to the spout.

The sleeve 20 includes at least two, and in one embodiment four, resilient finger members 220 diverging from one another to provide an enlarged circumferential opening at a lower end portion of the sleeve. Each finger member has a flange engaging surface 222 on an inner side or surface of the sleeve that is engagable with the flange portion 44 of the spout wherein at least a portion of the sleeve is axially disposable about at least the flange portion 44 of the spout when the resilient finger members are diverged away from one another. In one embodiment, the flange engaging surface 222 of the resilient finger members includes a first recessed portion 224 for engaging the first flange portion 47 of the spout and alternatively or cumulatively includes a second recessed portion 225 for engaging the lip portion 46 of the spout. A side wall portion of the sleeve may have an area of reduced thickness where the resilient finger members begin to diverge from one another to facilitate flexing of the resilient finger members as further discussed below. One or more seating flanges 230 are also disposed on the inner surface of the sleeve to axially align and seat or mate the sleeve with the end portion 42 of the spout when the sleeve is disposed over and about the flange portion of the spout as further discussed below. In another embodiment, a lower end portion 227 of the resilient finger members is seatable on the annular flange 48 of the spout to further axially align the sleeve with the spout. The sleeve 20 may include a collar locking means with one or more outwardly protruding resilient tabs 240 for engaging and locking the collar 30 relative to the sleeve when the resilient finger members are in the constricted configuration. Each resilient tab 240 has a bevelled upper surface 242 that permits the resilient tab to flex inwardly as the collar is slidably positioned toward the resilient finger members and over the resilient tab. A flatter lower surface 244 of the resilient tab 240 is engagable with the collar to prevent slippage or repositioning of the collar away from the resilient finger members and toward the upper portion of the sleeve without first manually depressing the resilient tab as further discussed below. An outer surface of the sleeve may also include one or more key ways 248 for aligning tab receiving apertures on the collar with the resilient tabs 240, and the resilient finger member 220 may include an outwardly protruding lip 226 for seating the collar 30 when the collar is positioned over the resilient finger members as further discussed below.

The sleeve 20 slidably houses the body 52 of the valve sub-assembly 50 along and axial dimension. Ribs 250 disposed on the inner surface of the sleeve are arranged along its axial dimension to position and guide the valve body within the sleeve, and in one embodiment a bottom edge portion of the ribs forms the seating flange 230 of the sleeve. In one embodiment, the sleeve has a closed upper end 260 and includes one or more slots 270 in side wall portions of the sleeve to accommodate the ports 56 of a T-shaped valve sub-assembly as it is slidably positioned along the axial dimension of the sleeve. The closed upper end engages the ports to prevent the T-shaped valve sub-assembly from being separated from the sleeve when the valve sub-assembly is withdrawn from the slider valve in the spout. The closed upper end may include a hole or port 262 to provide access to the body of the valve sub-assembly. Alternative embodiments of the sleeve may include only one or no slots depending on the port configuration of the valve sub-assembly. The ports 56 may, for example, instead be directed along an axial direction of the valve body and out the port 262 on the upper end 260 of the sleeve thereby obviating the necessity for the slots 270. The sleeve is preferably a unitary member, which is formable by a plastic molding process, and is assembled by first housing the valve sub-assembly within the sleeve before the collar is disposed about the sleeve as further discussed below. Other embodiments may include a two-part sleeve with a removable closed upper end 260 retained by screw threads, which permits assembling the valve sub-assembly in the sleeve by removing the threaded cap after the collar is disposed about the sleeve. FIG. 5a is a top view of yet another alternative embodiment of a sleeve that includes an open upper end, and FIG. 5b is a partially broken side view of the alternative sleeve along lines B—B of FIG. 5a. The alternative sleeve includes resilient tab portions 252 protruding from upper portions of the ribs 250 and extendable over an upper portion of the valve body to retain the valve sub-assembly in the sleeve, and flange member 233 extending between the bottom portion of adjacent ribs 250 may form part of the seating flange 230 for seating on the end portion 42 of the spout. All of the sleeve embodiments may include resilient tactile ribs 280 disposed on the inner surface of the sleeve to interact with flange portions on the body of the valve sub-assembly to provide a tactile indication of the position of the valve sub-assembly within the sleeve, which correspond to the open and closed status of the slider valve in the spout.

FIG. 6 illustrates the collar 30 including a body 320 with an inner surface 322 having a diameter sized to permit slidable passage of the collar over the sleeve 20 wherein the collar constricts the resilient finger members 220 as it is slidably positioned toward the lower end portion of the sleeve and over the resilient finger members. An outwardly flared flange 330 extends from a lower end portion of the body 320 and includes an upper surface 332 to facilitate slidably positioning the collar along the sleeve and a bottom surface 334 that is seatable on the flange 226 of the resilient finger members when the collar is positioned over the resilient finger members. The body 320 also includes an aperture 324 for receiving a corresponding resilient locking tab 240 protruding from the sleeve 20, and a protruding key 326 shown in FIG. 1 for aligning the apertures of the collar with the resilient tabs of the sleeve and preventing rotation of the collar about the sleeve. The collar 30 may also include an outwardly extending flange to further facilitate slidably positioning the collar along the sleeve. The outwardly extending flange is a continuous annular shaped member disposed about the collar, but most conveniently includes at least flange portions 340 with a lower gripping surface 342 disposed over the apertures 320 to permit sliding the collar away from the resilient finger members while simultaneously depressing of the resilient tabs 240 inwardly through the apertures 320 of the collar. This arrangement permits quick, single-handed de-coupling of the sleeve and collar assembly from the spout. The collar may also include slots 350 to accommodate ports 56 of the slider valve sub-assembly slidably positioned in the sleeve if required by the configuration and dimensions of the valve sub-assembly. The collar 30 is preferably a unitary member, which is formable by a plastic molding process.

In one mode of operation, the sleeve 20 and collar 30 assembly is coupled to the spout 40 by aligning an axis of the sleeve with an axis of the spout when the resilient finger members 220 of the sleeve are diverged outwardly to provide an enlarged circumferential opening at the lower or bottom portion of the sleeve. FIGS. 3 and 4 illustrate the collar slidably positioned away from the resilient finger members 220 and toward the upper end portion of the sleeve to release and permit the resilient finger members to assume the outwardly divergent configuration. The valve sub-assembly is also slidably positioned toward the upper end portion of the sleeve where it is retained by the collar. FIG. 3b shows the sleeve axially aligned with and positioned over the spout wherein the resilient finger members are in the divergent configuration to permit the lower end portion of the sleeve to be positioned about the flange portion 44 of the spout. The seating flange 230 of the sleeve is preferably, but not necessarily, seated on the end 42 of the spout, and in an alternative embodiment, a portion of the bottom surface 227 of the resilient finger members is seated on the flange 48 of the spout to further position and axially align the sleeve and the spout. The resilient finger members are constricted over the flange portion of the spout to couple the sleeve to the spout by slidably positioning the collar 30 from the upper end of the sleeve and over the resilient finger members toward the lower end of the sleeve as in FIGS. 6 and 7. As the collar slides over an outer side or surface of the sleeve it engages the outer surface of the divergent resilient finger members to increasingly constrict the finger members about the flange portion of the spout as the collar moves toward the lower end of the sleeve wherein the flange engaging surface of the resilient finger members is engageable with the flange portion of the spout to couple the sleeve to the spout when the resilient finger members are constricted about the spout by the collar as in FIG. 8. The coupling of the sleeve and collar assembly with the spout is thereby a single-handed operation. The collar locking means locks the collar over constricted resilient finger members to prevent slippage or re-positioning of the collar unless the resilient tabs 240 are depressed inwardly toward the sleeve to release or unlock the collar. The constricted resilient finger members are releasable by sliding the collar away from the resilient finger members and toward the upper end of the sleeve wherein the flange engaging surface of the resilient finger members is disengagable with the flange portion of the spout to de-couple the sleeve member from the spout when the constricted resilient finger members are released by the collar. The valve sub-assembly does not obstruct coupling and de-coupling of the sleeve and the spout since the sleeve and spout are coupled and de-coupled along a common axis.

After the sleeve and collar assembly are coupled to the spout, the valve sub-assembly is slidable from the upper portion of the sleeve and toward the lower portion of the sleeve to couple with the slider valve 60. Generally, the slider valve is in a closed position in the spout before the sleeve is coupled to the spout wherein the valve sub-assembly 50 is positioned toward the upper portion of the sleeve. In some embodiments, the valve sub-assembly 50 may be partially coupled with the slider valve 60 when the sleeve is seated on the spout as in FIG. 3, but the inner O-ring on the actuatable stem 54 is seated to close the fluid inlet port of the valve sub-assembly at least until after the outer O-ring on the valve body first forms a seal with the slider valve. The slider valve is opened by depressing and sliding the valve sub-assembly 50 from the upper portion of the sleeve toward the lower portion of the sleeve wherein the valve sub-assembly is driven into a receiving cavity 62 of the slider valve and the outer O-ring forms a seal between the slider valve and the valve sub-assembly. Further depressing and sliding of the valve sub-assembly causes a pin 64 protruding upwardly from the slider valve to actuate the stem 54 against the bias of spring 51 unseating the inner O-ring and opening the fluid inlet port. Continued depressing and sliding of the valve sub-assembly slides the slider valve to an open position in the spout to permit the flow of fluid into the inlet of the valve sub-assembly as in FIG. 8. The slider valve is closed by withdrawing the valve sub-assembly from the lower portion of the sleeve toward the upper portion of the sleeve. Wrap around flanges 66 of the slider valve engage a recess on the body of the body 52 and permit the valve sub-assembly to return the slider valve to the closed position. Depressing the resilient tabs 240 and sliding the collar 30 upward from the locked position toward the upper end portion of the sleeve, as discussed above, withdraws the T-shaped valve sub-assembly 50 and slider valve from the spout and toward the upper portion of the sleeve thereby closing the slider valve. The wrap around flanges of the slider valve release the valve sub-assembly after the slider valve is in the closed position in the spout, and the valve sub-assembly continues to be withdrawn from the spout by the sliding collar. The closing of the slider valve in the spout, withdrawing of the valve sub-assembly from the spout, and de-coupling of the sleeve and collar assembly from the spout are thus a single-handed operation. The closed end portion 260 or the retaining ribs 252 of the sleeve prevent the valve sub-assembly from being separated from the sleeve.

While the foregoing written description of the invention enables any one skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all of the embodiments within the scope of the appended claims.

What is claimed is:

1. An apparatus for coupling with a spout having a flange portion to permit coupling of a valve sub-assembly housed in the apparatus with a slider valve housed in the spout, the apparatus comprising:

a sleeve for slidably housing the valve sub-assembly, the sleeve having at least two resilient finger members diverging from each other, each finger member having a flange engaging surface engageable with the flange portion of the spout wherein at least a portion of the sleeve is axially disposable about at least the flange portion of the spout, the valve sub-assembly is slidable in the sleeve to couple with the slider valve in the spout when the sleeve is coupled to the spout;

a collar slidable over an outer surface of the sleeve for constricting the resilient finger members about the spout as the collar slides from an upper end of the sleeve and over the resilient finger members toward a lower end of the sleeve, and for releasing the constricted resilient finger members of the sleeve as the collar slides from the resilient finger members and toward the upper end of the sleeve, wherein the flange engaging surface of the resilient finger members is engageable with the flange portion of the spout to couple the sleeve to the spout when the resilient finger members are constricted about the spout by the collar, and wherein the flange engaging surface of the resilient finger members is disengagable with the flange portion of the spout to de-couple the sleeve member from the spout when the constricted resilient finger members are released by the collar.

2. The apparatus according to claim 1 wherein the sleeve includes a seating flange on an inner surface of the sleeve, the seating flange seatable on an end portion of the spout, and the flange engaging surface of the finger members includes a first recessed portion on the inner surface of the sleeve for engaging a first flange portion on an outer surface of the spout when the sleeve is seated on the spout and the finger members are constricted by the collar.

3. The apparatus according to claim 2 wherein the flange engaging surface of the finger members includes a second recessed portion on the inner surface of the sleeve for engaging a lip portion on the outer surface of the spout when the sleeve is seated on the spout and the resilient finger members are constricted by the collar.

4. The apparatus according to claim 2 wherein the sleeve includes collar locking means for locking the collar over the sleeve when the resilient finger members are constricted by the collar.

5. The apparatus according to claim 4 wherein the collar locking means is a resilient tab extending from the sleeve aligned and engageable with an aperture in the collar, wherein the resilient tab is inwardly flexible to permit passage of the collar over the resilient tab toward the resilient finger members, and the resilient tab is outwardly biased to protrude into the aperture when the resilient finger members are constricted by the collar.

6. The apparatus according to claim 5 wherein an end portion of the sleeve includes a outwardly extending lip portion, the collar seatable on the outwardly extending lip portion of the sleeve when the collar is positioned over the resilient finger members to constrict the collar about the flange portion of the spout.

7. The apparatus according to claim 4 wherein the sleeve includes alignment means for aligning the valve sub-assembly in the sleeve, and tactile means for indicting when the valve sub-assembly is slidably positioned in the sleeve for coupling with the slider valve.

8. The apparatus according to claim 7 wherein the valve sub-assembly is a T-shaped valve sub-assembly, the sleeve including slots for accommodating the T-shaped valve sub-assembly as the valve sub-assembly is slidably positioned in the sleeve, the alignment means including rib portions disposed on the inner surface of the sleeve along an axial dimension of the sleeve, a bottom portion of the ribs forming the seating flange.

9. The apparatus according to claim 8 wherein a top portion of the sleeve forms a closed end for retaining the valve sub-assembly in the sleeve, and the slots extends to a bottom portion of the sleeve between the resilient finger members to permit the valve sub-assembly to be housed within the sleeve.

10. A method for coupling a sleeve and collar assembly with a spout having a flange portion to permit coupling of a valve sub-assembly housed in the sleeve with a slider valve housed in the spout, the method comprising steps of:

axially aligning the sleeve with the spout;

axially positioning a lower end of the sleeve having resilient finger members that diverge from one another to form an enlarged circumferential opening about the flange portion of the spout;

constricting the resilient finger members of the sleeve about the spout by slidably positioning the collar from an upper end of the sleeve and over the resilient finger members toward a lower end of the sleeve so that a flange engaging surface of the finger members engages the flange portion of the spout to couple the sleeve to the spout; and wherein the valve sub-assembly is slidably housed in the sleeve to couple with the slider valve in the spout when the sleeve is coupled to the spout.

11. The method of claim 10 further comprising steps of seating a seating flange on an inner surface of the sleeve on an end portion of the spout, wherein the step of engaging the flange portion of the spout includes a step of engaging a first flange portion on an outer surface of the spout with a first recess portion on the inner surface of the resilient finger members.

12. The method of claim 11 further comprising a step of locking the collar over the sleeve when the resilient finger members are constricted by the collar.

13. The method of claim 12 further comprising a step of seating the collar on an outwardly protruding lip portion of the sleeve when the resilient finger members are constricted by the collar.

14. The method of claim 13 further comprising steps of aligning resilient tabs that protrude from the sleeve and with corresponding apertures on the collar to lock the collar over the sleeve when the resilient finger members are constricted by the collar, and providing a tactile indication of the position of the valve sub-assembly within the sleeve.

* * * * *